Nov. 9, 1948.  J. W. KARWEIT  2,453,136
CHIP BREAKING DRILL CHUCK
Filed April 26, 1943  7 Sheets-Sheet 1
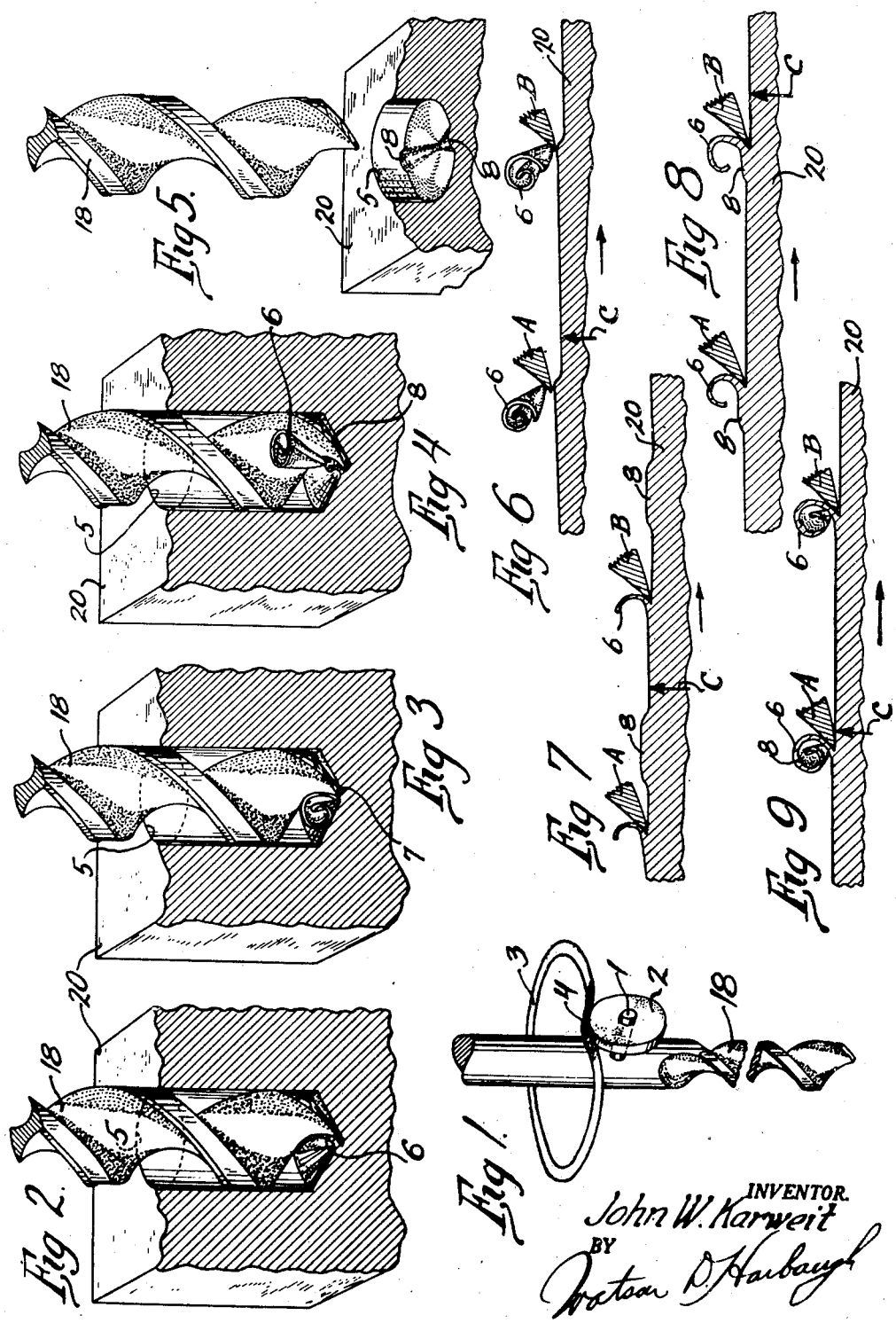

Nov. 9, 1948. J. W. KARWEIT 2,453,136
CHIP BREAKING DRILL CHUCK
Filed April 26, 1943 7 Sheets-Sheet 2

INVENTOR.
John W. Karweit
BY
Horton P. Harbaugh
HIS ATTORNEY

Nov. 9, 1948.  J. W. KARWEIT  2,453,136
CHIP BREAKING DRILL CHUCK
Filed April 26, 1943  7 Sheets-Sheet 3
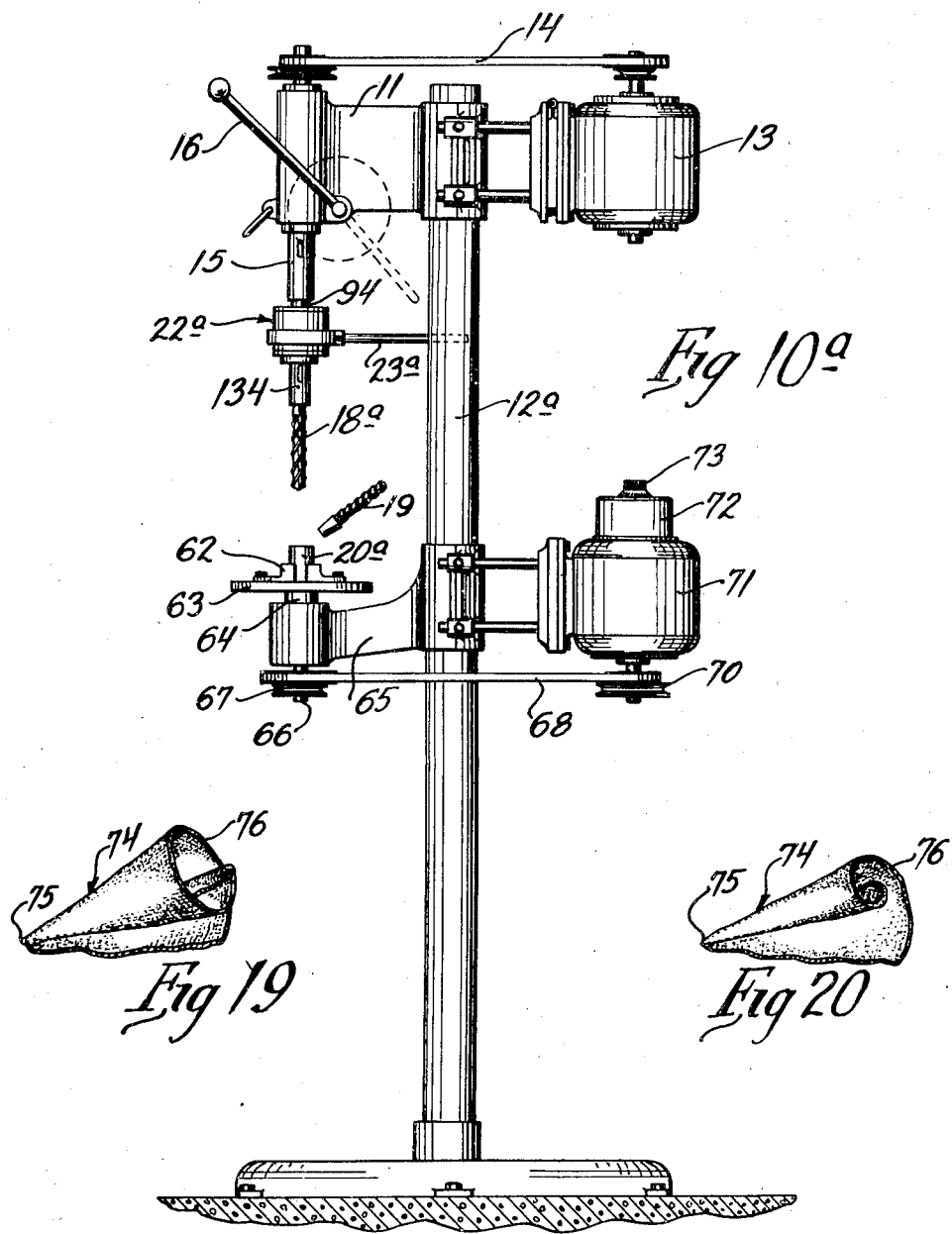

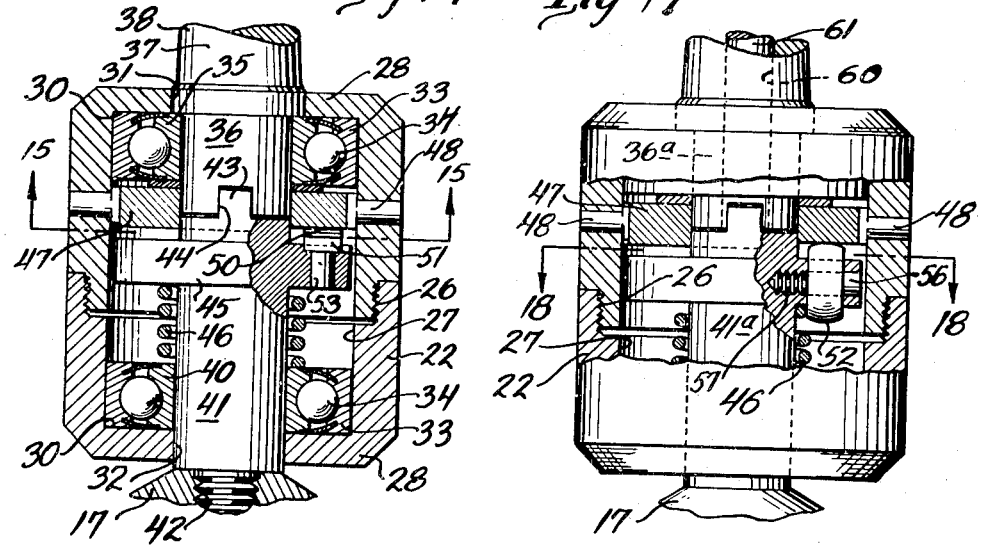
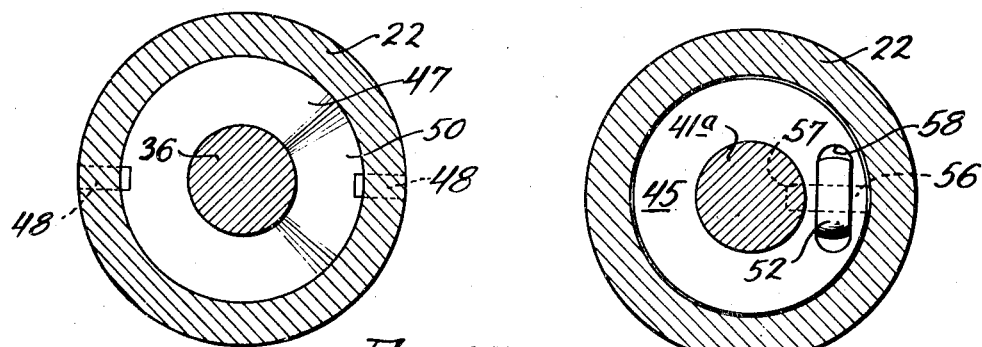
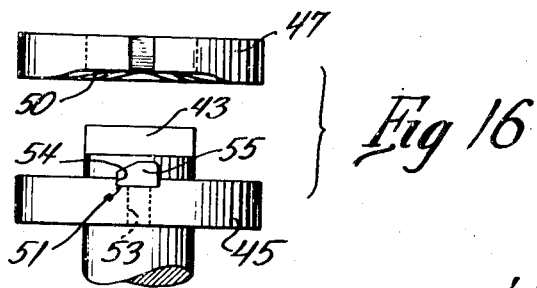

Nov. 9, 1948.    J. W. KARWEIT    2,453,136
CHIP BREAKING DRILL CHUCK
Filed April 26, 1943    7 Sheets-Sheet 5
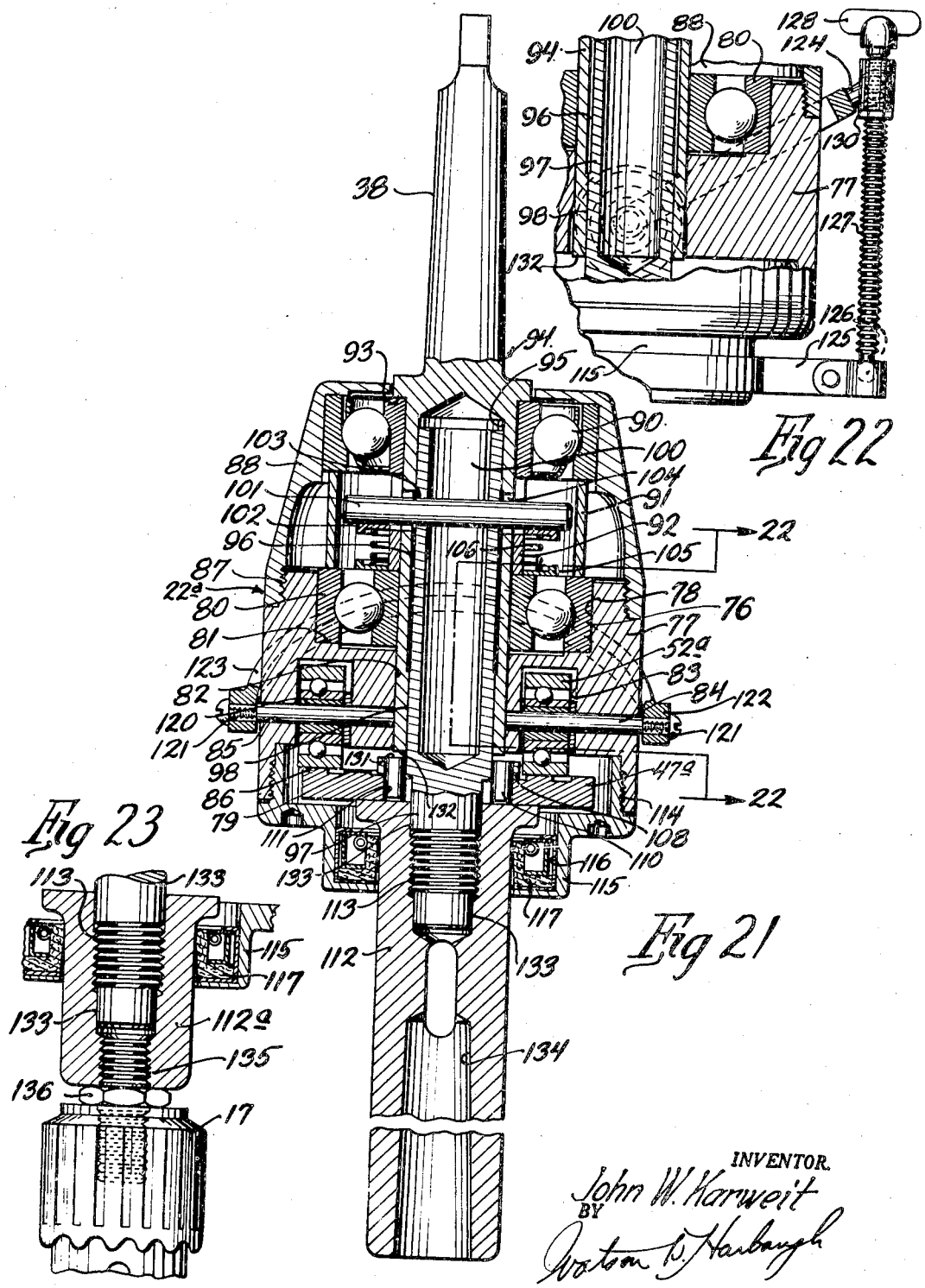
INVENTOR.
John W. Karweit
BY
Watson B. Harbaugh
HIS ATTORNEY

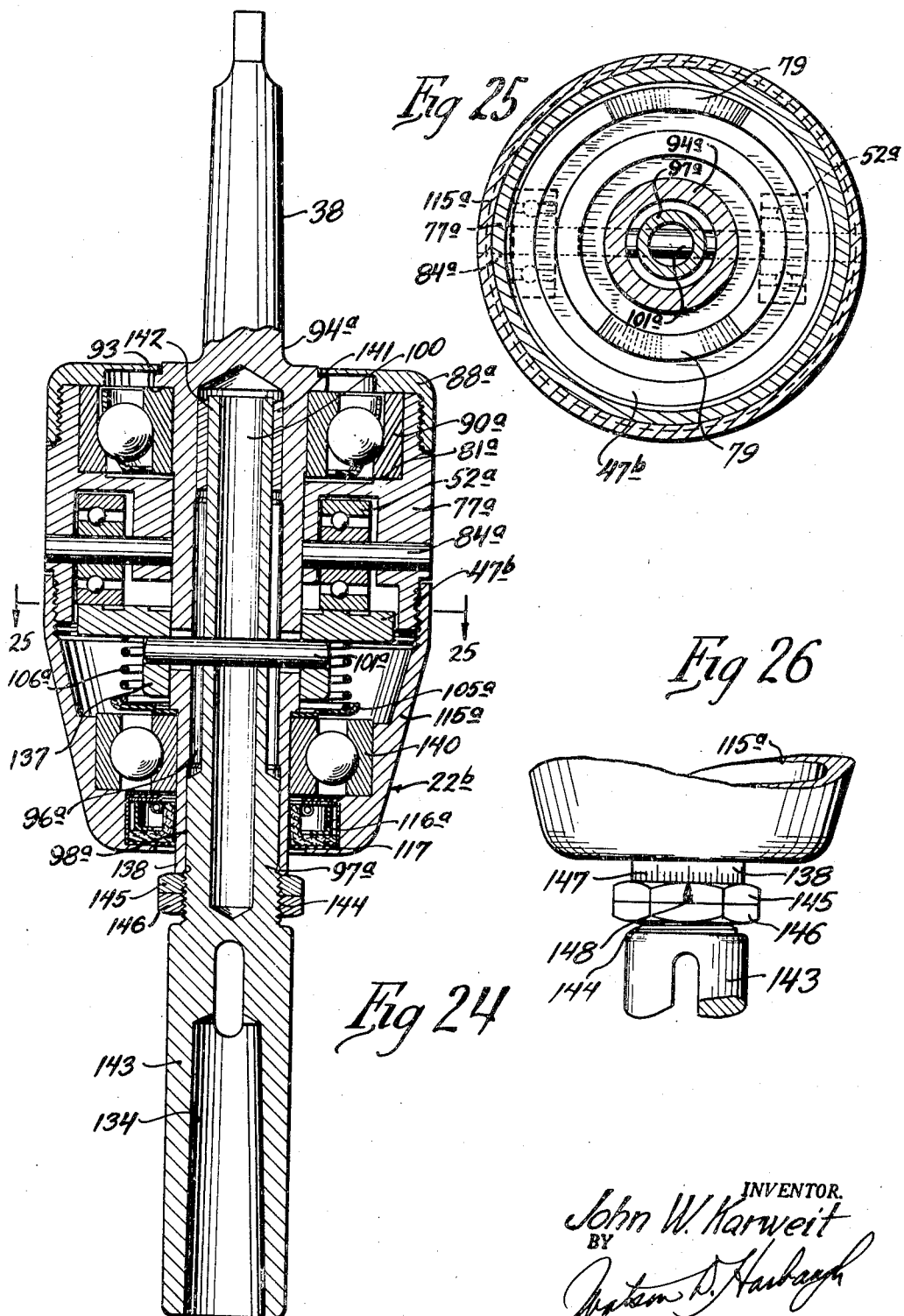

Patented Nov. 9, 1948

2,453,136

UNITED STATES PATENT OFFICE 2,453,136

CHIP BREAKING DRILL CHUCK

John W. Karweit, Skokie, Ill., assignor, by mesne assignments, to Ex-Cell-O Corporation, Detroit, Mich., a corporation of Michigan Application April 26, 1943, Serial No. 484,612

28 Claims. (Cl. 77—5)

The present invention relates to the art of drilling a hole in a machinable material such as metals, alloys, elastomers and plastics, usually done with what are known as twist drills. Machinable material as used in the description and claims is for the materials mentioned, and is in keeping with shop parlance to identify material ductile enough that a shaving such as a chip progressively cut from the material, as by a twist drill, does not break under the cutting strain imposed upon it by a cutting edge fed into the material. Twist drills are so called because one or more grooves, usually two, are spirally formed in the body of the drill between the point and shank as by twisting a flat strip of steel or by milling a bar of steel to provide spiral channels for the ready passage of chips and lubricant lengthwise of the drill.

A column of metal stock is thus disposed along the axis of rotation of the drill centrally between the channels or flutes and is commonly known as the web. The metal stock extending to the periphery of the drill upon both sides of the web are called the lands. The ends of the lands at the point of the drill are ground at an angle to the axis of the drill to provide cutting edges or lips equal in length and equally inclined so that the cutting edges define a surface of revolution comprising a flat cone when the drill is rotated.

Trailing the cutting edges, the end faces of the lands are ground away or relieved to provide a clearance permitting the cutting edges to bite into the work piece under feed pressure, and the side faces of the lands between the flutes are ground away or relieved behind the leading edge to provide body clearance between the land and the wall of the hole being cut by the drill.

The drilling of the hole is accomplished by the cutting edges. These edges, when the drill is rotated and fed into the work piece, simultaneously cut along spiral paths and each edge removes from the work piece at the bottom of the hole a ribbon of material identified as a chip. In conventional drilling, the chip is attached to the work piece ahead of the cutting edge and being short sided on the inner edge curls and rotates in the flute as well as with the drill as it creeps through the flute from the cutting edge to the mouth of the hole. As a general rule, it is expected and has been heretofore considered desirable that the chip from each cutting edge be one continuous ribbon from the cutting edge to the mouth of the hole to keep the chip moving.

In using a twist drill, the speed and feed vary with the circumference of the hole, the character of the material being drilled and the ability of a particular drill to withstand heat generated while cutting the material, and, in order to assist operators in using a twist drill properly the speed of a twist drill, i. e. the number of revolutions per minute (R. P. M.) and the "feed" or the distance a drill is advanced per revolution into the work piece, are rated for optimum results in Engineer's Handbooks.

The ratings are set down in tables. The circumference of the hole and the material to be drilled are rated in terms of lineal cutting speeds namely "feet per minute" for the material, and the circumference of the hole is translated into drill size or diameter. The ability of the drill to stand up is rated in relation to whether it is made of high speed steel or carbon steel.

For instance, the base cutting speed of 1020 S. A. E. steel is rated at approximately 80 to 90 feet per minute as rated by the steel manufacturers for a twist drill made of high speed steel. Taking then a drill of a size of one inch in diameter, the R. P. M. could be varied from 300 to 350. Reference being made to the catalogue No. 44 of The Cleveland Twist Drill Co. (Copyrighted 1941), the R. P. M. is higher for smaller drills, for instance, 1375 R. P. M. for a one-quarter inch drill, and slower for larger drills, for instance, 170 R. P. M. for a two inch drill.

Feeds are governed generally by the size of the drill and the material being drilled, once the speed or R. P. M. of the drill is determined. For example, the feed should be from .004 to .007 of an inch for drills from ¼ to ½ inch; .007 to .015 of an inch for drills from ½ to 1 inch in diameter, and as much as .025 for drills larger than 1 inch.

From the data given in such tables, experienced operators make further adjustments for particular materials and circumstances.

Considering then the length, nature and size of the chips, their work hardened characteristic, and the speed with which they are whipped around by the flutes as they pass through the flutes and out of the mouth of the hole, it is appreciated how the chips can badly score the wall of the hole and cause friction which generates heat that robs the lubricant of its coolant character by the time it reaches the cutting edges. Furthermore, as the chips leave the mouth of the hole, they swing wide at great speed, scatter lubricant over the work, the machine, and the operator, and intermittently break and fly tangentially at high velocity forming dangerous projectiles. Often the chips break in the flutes into irregular and uncontrollable forms to jam in the flutes, checking lubrication and augmenting the scoring of the wall of the hole.

These and other difficulties familiar to all drill users increase with the depth of the hole and with the stringiness of the material. In fact, it is seldom possible with holes deeper than two or three diameters of the drill to complete the operation without withdrawing the drill point from the hole repeatedly to clear the flutes of the chips jammed in them. This consumes work time of the machine and is a burden upon production involving expensive special machinery, generally termed step drillers, if the feed is to be done automatically.

The scoring of the walls of the hole causes a rough uneven finish that may require reaming and the hole is generally of an uncertain oversize in metal or generally undersized in plastics.

The principal object of this invention is to eliminate these difficulties and hazards, speed up production, and provide improved wall finish, hole size and alignment regardless of hole depth and material involved.

As a corollary to the principal object, a further object is to provide an apparatus, which, while the drill is in operation, produces at the cutting edges, chips which are of a regulated, substantially uniform size and shape for a given drill size, regardless of the material being drilled, and the size of the chips is so regulated as to be small enough to clear the drill flutes easily, yet large enough and curled sufficiently that chips will not pack in the flutes.

Generally speaking, this is accomplished by periodically interrupting the feed pressure on the drill long enough to allow the cutting edges to sever from the work, the chips being formed, and then quickly returning the drill into cutting position to make other chips to be severed like the first ones. Preferably, the cutting edges are lifted slightly from contact with the material at the bottom of the hole to cut the chips free from the work repeatedly at predetermined intervals, which intervals preferably occur in stepped relation to the rotation of the drill, so that the chips are fairly uniform in size and shape and suitable for quick and complete removal from the hole to be deposited quietly and safely upon the work around the mouth of the hole for subsequent disposal and reclamation, if desired.

In performing the process of the invention, the duration of the cut between severances of the chips may be varied with the material, the diameter of the hole, and other conditions, but in general, and by way of example, somewhat less than 360 degrees or one complete revolution has proven satisfactory for a large class of materials on which twist drills are commonly used.

Some engineers or operators will prefer to reduce the length of each cut between severances in order to reduce the size of the chips for a particular material. Others will wish to increase the length of the cut beyond one complete revolution. Furthermore, some operators will favor having the lifting and returning of the cutting edges take enough time that the movement of the drill and supporting parts will occur comparatively smoothly, whereas others will desire a very quick lift and return of the drill to provide a vibration conducive to keeping the chips loose in the flutes, depending, of course, in part upon the R. P. M. of the drill.

For example, with a drill having two cutting edges, severance of the chips is preferably controlled to occur once each revolution, and the distance the drill is moved to sever the chip will range from .010 to .035 of an inch, slightly more in large drills, depending upon the feed of the drill, and the rigidity of the drill press being used. Each time a serverance is made, the drill and work piece are returned to cutting relationship as soon as possible.

If lubricant is employed, the distance the drill is moved is preferably arranged to be enough to permit both sides of each cutting edge to be bathed with lubricant before the cutting edges again engage the work piece. Because of this, tool life of the drill is favorably affected.

The means by which a twist drill can be fed and controlled, as indicated in the above procedure, are so variable and so numerous that only a few suggested forms may be appropriately disclosed, and it is to be understood that by those selections, there is no intent to abandon the many others which may include hydraulic and electrical equipment for the purpose, and there is no intent to correspondingly limit the claims directed to the apparatus.

Furthermore, it is a matter of choice whether the drill is fed relative to the work or the work is fed to the drill, or each is moved relative to the other. Hence, when motion of either is mentioned, the language should be considered broadly unless the context makes it appear otherwise.

These being among the objects of the present invention, other and further objects and advantages will become apparent from the drawings, the description relating thereto and the appended claims.

Fig. 1 is a simple schematic illustration in perspective of certain cooperating elements by which the process accomplished by the present invention can be best comprehended.

Fig. 2 is a perspective view taken on line with one of the cutting edges of a twist drill having two cutting edges, and a work piece partly in section showing the chip being formed after about a quarter of a revolution of the drill.

Fig. 3 is a view similar to Fig. 2 showing the position of the drill just after the chips have been severed from the material at the bottom of the hole.

Fig. 4 is a view similar to Figs. 2 and 3, showing the drill starting another cut and the prior severed chip disposed in the flute to be carried out of the hole as an independent particle.

Fig. 5 is a view similar to Figs. 2, 3 and 4 with the drill withdrawn so that the bottom of the hole can be seen with the humps therein as left when a chip has been severed and a new cut not entirely completed.

Figs. 6 to 9, inclusive, are a schematic diagram of the operation of the two cutting edges at the bottom of the hole at successive positions of the cutting edges in the work piece with the circumference of the cut laid out flat, the same point upon the work piece indicated by an arrow and the respective cutting edges identified with "A" and "B."

Figures 10, 11, 12, 13:
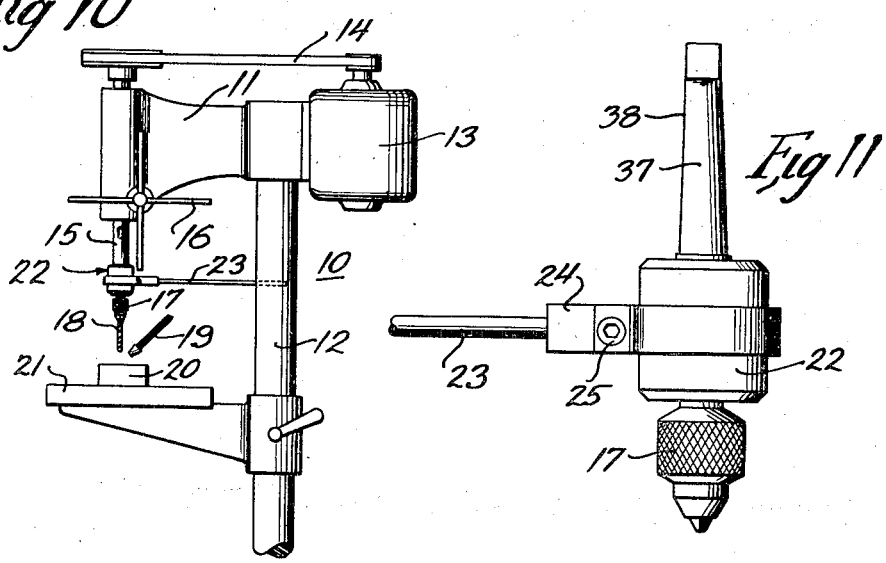

Figs. 10 and 10a are side elevations of hand feed drill presses upon the quills of which preferred embodiments of the invention are installed, the work piece being rotated in Fig. 10 as well as the drill.

Fig. 11 is an enlarged side elevation of a preferred embodiment of the invention as it appears when assembled and ready for use.

Fig. 12 is an end view of the construction shown in Fig. 11.

Fig. 13 is a view similar to Fig. 10 illustrating a novel combination of an automatic forward traverse drill press with an axially vibrating twist drill for boring soft and stringy metals.

Fig. 14 is an enlarged vertical section of the device shown in Fig. 11 illustrating one form of the invention.

Fig. 15 is a section taken on line 15—15 in Fig. 14.

Fig. 16 is an exploded view of the cam and follower construction shown in Fig. 14.

Fig. 17 is a view similar to Fig. 14 showing the preferred form of the cam and follower, and Fig. 18 is a section taken upon the line 18—18 in Fig. 14.

Figs. 19 and 20 are perspective views of some characteristic chips produced by the process.

Fig. 21 is a vertical section of another form of attachment with which the distance of the drop away of the work piece and drill can be varied.

Fig. 22 is a section taken on the line 22—22 in Fig. 21.

Fig. 23 is a section illustrating how a chuck not having a Morse taper can be installed upon the device.

Fig. 24 is a vertical section similar to Fig. 21 of another embodiment by which the distance of the drop away between the work piece and drill can be adjusted.

Fig. 25 is a section taken on line 25—25 in Fig. 24.

Figure 27:
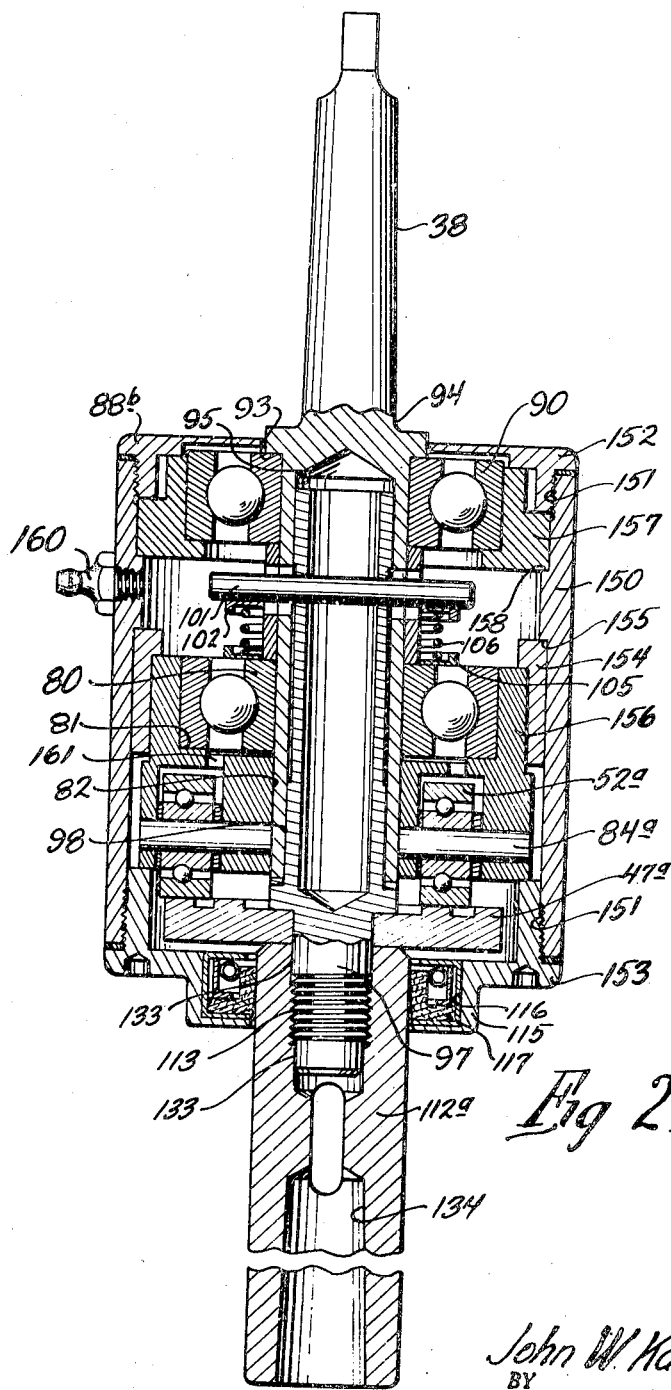

Fig. 26 is a side elevation illustrating the micrometer adjustment as it appears to an operator who contemplates changing the adjustment, and Fig. 27 is a vertical sectional view of another form of attachment in which the cams of different depths can be changed.

To help explain the invention with a simple illustration, reference is made to Fig. 1 wherein a drill 18 has mounted thereon a shaft 1 upon which a cam follower 2 is journalled. The drill, shaft and follower are movable as a single unit axially as controlled by a cam whose contour is shown diagrammatically as a path 3. The cam is held against rotation. Therefore, as the drill is rotated, it receives a short and brief reciprocation once each revolution when the follower passes through the cam dip 4. Bodily movement of the cam downwardly feeds the drill into a work piece.

As shown in Fig. 2 the drill 18 is shown in its working position in a hole 5 in a work piece 20. The drill has been rotated approximately a quarter turn after the follower 2 left the cam dip 4 and the chip formed in that time is indicated at 6.

The drill has completed in Fig 3 the turn partially completed in Fig. 2 and has come to the position where the follower 2 is at the bottom of the dip 4 as shown in Fig. 1. The chip 6 has just been terminated, leaving a slight step 7 where the cutting edge of the drill has cut free of the work piece to sever the chip.

In Fig. 4 another cut is barely started, making of the step 7 a hump 8 and immediately thereafter the drill is retracted, as shown in Fig. 5, to show the humps 8 left by the two cutting edges.

So far, the action of only one cutting edge has been described. There is also a cooperation between the two cutting edges more than either of them acting separately. This cooperation is brought out in Figs. 6 to 9, one cutting edge being identified as A and the other as B with a constant point upon the periphery of the cut, as laid out flat, identified by the arrow C.

In Fig. 6, the position of the cutting edges and work are comparable to the relationships shown in Figs. 1 and 3, the chips having just been severed from the work. In Fig. 7 new cuts are started, and in Fig. 8 the hump left by each cutting edge is cut from the work by the other cutting edge before other humps are made. With this arrangement, when an extra revolution of the drill is made without feed, the bottom of the hole is cut clean of humps. In Fig. 9, the cutting edges are about to terminate the second set of chips.

*Figures 10 to 18*

As shown in Fig. 10, the invention is illustrated in connection with a drill press 10 having a drill head 11 mounted upon a standard 12 where, upon one side it carries a motor 13 which drives through a V-belt 14 and upon the other side it journals a quill 15. The quill 15 is reciprocated for feed and return movements as controlled by a manual throw 16 and carries on its lower end a chuck 17 supporting a drill 18 over a work piece 20 that rests upon a table 21. A lubricant line 19 is provided if a flow of lubricant is desired.

The device embodying the invention is disposed between the quill 15 and the drill chuck 17 where, as more particularly shown in Fig. 11, an outer casing 22 is held against rotation by an arm 23 resting against and sliding up and down on the standard 12 during feed movement of the drill. The arm 23 is fastened to the casing 22 by means of a split collar 24 and clamp screw 25, and may be of any suitable size or shape to contact a stationary part without hindering the feed traverse.

The casing 22 (Fig. 14) is in two parts threaded together as at 26 and cooperating to provide a cylindrical compartment 27 terminating at opposite ends in flanges 28 extending radially inwardly to provide shoulders 30 and axially aligned openings 31 and 32 at the top and bottom of the casing, respectively.

The outer races 33 of frictionless bearings 34 are pressed into the cylindrical bore to rest snugly against the shoulders 30 (Fig. 14) and the inner race 35 of the upper bearing receives in supporting relation the lower end 36 of a shank member 37 having a conical upper end 38, such as a Morse taper, receivable in the quill 15.

The inner race 40 of the lower bearing receives a spindle 41 threaded as at 42 to receive the conventional chuck 17, and has upon its upper end a tang 43 which engages in driven relationship in a kerf 44 upon the shank 36. Although a tang and kerf drive is shown, a spline or slip sleeve drive may be employed since the relationship shown is merely representative of a drive permitting relative axial movement during the drive.

A radial flange 45 is provided upon the spindle 41 and a compression spring 46 is disposed between the flange and inner race 40 of the lower bearing to hold the tang and kerf in driving relationship and in an upwardly restricted position.

Above the flange 45, a washer 47 is locked rigidly in place in the casing 22 by set screws 48 and upon the bottom face thereof is provided a relieved portion 50 about .015 of an inch in depth which provides a depression serving as an axial cam (Figs. 15 and 16). Engaging the cam is a hardened pin 51 as shown in Figs. 14 and 16 or a roller 52, as shown in Figs. 17 and 18, which serves as a follower. In most instances for simplicity of construction the hardened pin will suffice, but where through long and hard service, wear becomes an important factor, it is preferred to use the roller.

When using the pin 51 (Fig. 16), the flange is bored as at 53 and countersunk as at 54 to provide a configuration which prevents turning of the pin, the pin having a hardened head 55 which fits down into the countersink and from which position it is readily removable. In the case of the wheel, the axle 56 is disposed radially to the spindle 41a as received in a radial bore 57 that bisects transversely a cage opening 58 into which the roller is received. The periphery of the roller is preferably rounded to provide a line rolling contact with the cam (Fig. 17) but it can be beveled and the cam correspondingly contoured to provide a wider contacting area if desired.

In the device shown in Fig. 17 the shank 36a is bored out as at 60 in its lower end to receive a rod like extension 61 upon the upper end of the spindle 41a so that alignment of the spindle with the shank is had at widely spaced support points, the spacing of the bearings providing in part this support characteristic, and the length that the extension 61 telescopes in the opening 60 serving in a like capacity.

In some installations, and by way of suggesting how the device can be used with a different timing of the reciprocation, the roller can be mounted on a piston 70 reciprocably movable axially with respect to the casing and work table 74. As shown in Fig. 13 where an automatic feed drilling machine unit is shown, (such as those illustrated upon page 72 of the book on Drilling and Surfacing Practice by Colvin and Stanley, McGraw-Hill) the piston in turn can be reciprocated by a rotary cam or hydraulically by means of a transmission 72 connected into the main motor drive 73 to provide any timing desired for the reciprocable movement of the drill.

Furthermore, in connection with Fig. 13 if the drill shown is provided with a feed traverse into the work 20a to a depth greater than five diameters, this traverse can be had without interruption of the feed traverse. The work piece is one of many mounted upon an indexing table 74 to be operated upon at a plurality of stations. With the present invention extra heads are dispensed with at different stations as conventionally required to drill successively the same hole deeper. The head 73 and feed, as shown, drill a deep hole in the work piece all at one station.

For a better understanding of the problem thus solved by the invention, references is made to pages 155 to 185 of "Machine Tools at Work" by Herb (Industrial Press). See particularly page 157, line 11; page 158, line 12; page 163; page 180, line 9, and illustrations.

As the shaving is repeatedly broken or cut into small chips by the present invention during the drilling operation by the reciprocation of the drill, as described, during or throughout the feed traverse, a vibratory condition is set up wherein the chips are kept in constant agitation. This agitation maintains a looseness beneficial to the chips clearing themselves through the flutes or being worked out by a flow of cutting oil generally supplied to drills where they are under continuous operation.

Because of this, the control 75 of the automatic head 73, shown in Fig. 13, can be moved to "start" 76 and the hole cut in a single traverse at one station and within the time permitted for each of the other heads to complete their cycles such as countersinking or tapping the work piece.

It will be seen that the device can be readily dismantled, repaired and assembled should any part be defective, or alteration be desired. The direction of the threading between the two parts of the casing is counter-clockwise for tightening under use. For instance, if the upper part of the casing is clamped, the thread is left hand to tighten under the influence of the clockwise tendency imparted to the lower casing by drill rotation. Otherwise it is preferred to employ the split ring clamp to hold both parts in their mutually tightened relationship. Removal of the clamp and unthreading of the parts, opens the device and all parts to ready inspection.

Referring to Fig. 10a, an arrangement is shown wherein the work piece 20a is rotated as well as drill 18a. For this purpose the work piece 20a is clamped by fixtures 62 upon a rotating table 63 carried upon a shaft 64 that is journalled in the bracket 65. The bracket 65 is mounted for vertical and lateral adjustment upon the column 12a and the lower end 66 of the shaft 64 receives its drive through a step-pulley 67 which is driven by a belt 68 engaging a drive pulley 70a upon a variable speed, reversible motor 71. The direction of rotation of the motor 71 may be reversed by any suitable means 72a and a speed control, preferably of a centrifugal type, is employed to provide minute increments of speed adjustment as controlled by the micrometer adjustment 73a.

The head upon which the drill 18a is supported and rotated is somewhat similar to the one shown in Fig. 10 and like numbers refer to like parts insofar as pertinent.

In the embodiment disclosed in Fig. 10a it is possible to regulate the length of the chips which are cut from the work piece 20a by the drill 18a. Not only does the rotation of the work piece assist in providing precise hole alignments, but with a double lip drill, such as 18a, reciprocated once each revolution, if a smaller chip is desired, the work piece 20a may be rotated in the same direction that the drill 18a is rotating. This relationship would provide a series of reciprocations, timed to occur more often than once each relative revolution of the drill and work piece. However, for optimum results in the direction of smaller chips the reciprocation should not recur so soon that each cutting edge does not cut through to the place where the other cutting edge was returned to the work piece following the preceding reciprocation. It has been found quite desirable that each cutting edge overlap to some degree the cut made by the preceding edge. (See Figs. 8 and 9.)

It is possible that reciprocation of the drill can be made more often than that just described provided the cutting edges enter the work piece ahead of the hump and cut through a prior made hump before leaving another one. Reciprocations occurring more often than once each revolution have the disadvantage of a loss of cutting time, due to the cutting edges being out of cutting position more of each revolution.

However, adjustments in the direction of providing reciprocations of the drill more often than once each relative revolution do have some advantage and is of significance when drilling metal whose machining generates a high temperature. Under such conditions the advantage in some instances of having the cutting edges bathed with lubricant more often outweighs the loss of cutting time. The increased bathing of the cutting edges with lubricant has the definite advantage of keeping the drill cool and thereby increasing its life.

On the other hand, as when cutting metal which will permit it, such as aluminum, the reciprocations need not be had as often as once each revolution if a gain upon the cutting time is desired. In this instance, the work piece 20a is rotated in a direction opposite to the rotation of the drill 18a. The optimum limit in this relationship is not to have the chips so large that they have difficulty clearing the flutes, or the drill is held in cutting position so long as to heat unduly.

Thus, it will be seen that with the embodiment illustrated in Fig. 10a that within a substantially wide range of chip sizes, a balance can be established between the size of the chip and the coolant factor for the drill, it being appreciated that these variables can be further controlled in either direction desired by varying the speed of the drill 18a upwardly or downwardly through step pulley changes to seek and provide an optimum for a given material in production.

Furthermore, it is appreciated by those experienced in the art that a double advantage is gained in the relationship just discussed. Not only deos the arrangement provide for varying chip size and lubrication to gain the best results, but also provides beneficial results as regards hole alignment in the work piece.

In event it is desired to rotate a drill 18a of a small diameter at such a speed that an unduly high vibration would arise with the reciprocating action in which the follower would have difficulty in maintaining contact with the cam, a relationship can be established between the drill and work piece in which the drill 18a and the work piece 20a are rotated in opposite directions at the same speed. For instance, the drill 18a could be rotated from 1500 to 2000 R. P. M., or higher, and the work piece 20a at the same speed in the opposite direction, thereby giving an additive relative rotation of 3000 to 4000 R. P. M. In this instance, the drill 18a would be provided with a cam which would oscillate the drill 18a twice each revolution of the drill, yet only once each relative revolution between the drill and work piece. From this relationship, the speed of rotation of the work piece 20a can also be varied up and down to provide the relative results already described, to vary the size of the chip and provide optimum lubrication.

It is preferred for general use in drilling operations that the drill be in cutting position approximately 300° of each revolution, and that the reciprocation take place in approximately 60° of each revolution, it being suggested that where power or automatic feed is employed, it is particularly desirable to have the drill drop away and return to the work as rapidly as possible within the ability of the reciprocated mass to have weight inertia overcome.

Figures 19 and 20

By way of example of the chips which are to be expected with such an arrangement, two characteristic chip forms are shown in Figs. 19 and 20. These chips are characterized by a conical shape, spiralled somewhat like a cockle shell, in which form it is difficult for the chips to become packed in the flutes. As the chips are formed at the cutting edges of the drill they tend to nest sufficiently to be directed easily out of the flutes under the oscillation imparted to the drill. Although the spiralled edge 76a of the chip 74a is not as long as 300° of the circumference of the cut, this is due to the fact that as the cutting edge removes the metal from the work piece the stock of the chip has a tendency to gather and thicken at the time the cut is being made, after which a curl is imposed upon the chip by the rake face of the flute above the cutting edge. For this reason, the wall of the resulting chip is a little thicker than the feed distance of the cutting edge and if the material cut is within the range of machinability, the chip will preserve its form, thus imposed upon it, until disposed of away from the drill press. Moreover, since the chip is capable of preserving its form even after it leaves the mouth of the cut, it can be moved and handled by the flow of lubricant, which flow might otherwise have to be stronger if the chip was of any other shape.

Figures 21 to 23

Referring to Fig. 21 of the drawings, another construction is shown wherein the cam 47a is provided with the maximum expected reciprocation and a means is provided by which the distance the followers 52a is permitted to reciprocate is adjustable, i. e., the follower is permitted to drop into the cam depression and adjustably limited distance to control the drop away of the drill from the work piece in relationship to any particular drill size or type, the deflection present in the drill press and the material being drilled.

In accomplishing this, it is preferred to provide two followers 52a disposed upon opposite sides of the axis of rotation so that the thrust load carried by the followers and the cam is substantially balanced to relieve any cocking or binding that otherwise might occur between the reciprocating parts under heavy feed pressures.

In providing this construction a substantially cylindrical follower cage 77 is carved out of rod stock or a die made part, and machined to provide a cylindrical cavity 76b in its upper end to receive a frictionless angular contact bearing 80 therein against a shoulder 81. A central opening 82 is provided in the cage large enough to receive and clear rotary shafts as will be shortly described.

Cavities 83 are provided in the central portion of the cage to receive frictionless bearing followers 52a. These followers are mounted upon pins 84 which are journalled in transverse bores 85 provided for them through the walls of the cavities. The cavities 83 are spaced from the axis of rotation different radial distances so that the bearings 52a engage the cam 47a at different radial distances, it being pointed out at this time that the upper face of the cam 47a is provided with concentric tracks 86, one for each of the followers separately. In these tracks are provided diametrically opposite each other a cam dip or depression 79 (Fig. 25) for each track so that the cam will be permitted to move upwardly only once each revolution. Reference is hereby made to my copending application, Serial No. 466,273 for a further understanding of this relationship and the advantages of such a cam and follower arrangement.

The upper end of the cage is externally threaded as at 87 to receive a top cover 88 which carries an upper frictionless bearing 90. Spacers 91 and 92 are provided between the outer and inner races of the respective frictionless bearings to preload the bearings slightly, if desired, if radial bearings are used. However, it is preferred to use an angular contact frictionless bearing at 80 to carry the thrust load from the cage 77 through to the inner spacer 92 to the inner race of the bearing 90 and to a shoulder 93 provided upon the spindle 94. In this way any end thrust exerted against the followers 52a is transmitted to the shoulder 93 by the bearing suitable for the maximum expected feed pressure.

Located between the frictionless bearings 80 and 90 are disposed the parts which will shortly be described by which the cam 47a is urged to cooperate with the followers, when free to do so. A female spindle 94, having a Morse male taper 38 at the top, is internally ground as at 95 and relieved as at 96 to receive in reciprocable relationship therewith an oscillating male spindle 97 which is externally ground to close clearance as at 98 to be received in the female member. The male member is hollowed out as at 100 to reduce its weight and transversely through the walls of the male and female members where they telescope, a pin 101 is provided to establish a rotary drive between the male and female members. A seat for a spring retainer 102 rests against the pin 101. The pin fits tightly as at 103 in the male member, but is received in a longitudinally elongated slot 104 on the female member to permit the pin and the male member to reciprocate axially. A second spring retainer 105 rests against the inner race of the bearing 80, and between the spring retainers a compression spring 106 is provided to urge the pin 101 and the male member 97 upwardly.

At the lower end of the male member a squared shoulder 108 is provided and drilled to receive longitudinally extending pins 110 therein that engage in corresponding slots 111 in the cam. The cam is held tightly against the shoulder 108 by means of a drill supporting element 112 threaded to the lower end of the male member 97 as at 113.

The lower end of the cage 77 is threaded as at 114 to receive a bottom cap 115 recessed as at 116 to support a grease seal 117 which rests against the outer surface of the element 112.

Adjustment regarding the relative drop permitted between the cam and follower assembly is had by journalling the pins 84, as already mentioned, in the cage 77 with an eccentric sleeve 120 press fitted thereon to receive upon its outer surface the inner race of the frictionless followers 52a. In order to rotate the eccentric sleeves by means of the shafts 84 the outer ends of the shafts 84 are provided with a polygonal contour 121 upon which is received correspondingly conformed ends 122 of a yoke 123 which extends around the cage 77. The yoke is provided with a swivel securement 124 midway its ends (Fig. 22) and the bottom cap 115 has clamped thereto a carrier 125 in which is supported in a ball and socket relationship the end 126 of an adjusting screw 127 controlled by a winged cap 128. The swivel carries a runner 130 for the screw 127 which raises and lowers the yoke through the swivel securement 124. Rotation of the winged cap 128 varies the position of the yoke with respect to the cage 77 and thereby the relative location of the eccentric sleeves with respect to the cam 47a, forcing the followers to permit the cam to move upwardly under the influence of the spring 106 when free to move in that direction.

The depth to which the cam 47a is permitted to follow the followers 52 when the followers enter the depressions 79 upon the cam may be determined at one of two points, or both, namely, an engagement between the upper face of a flange 131 on the male member 97 and the lower end 132 of the female member, or, engagement between the pin 101 and the upper end of the slots 104, this clearance being shown at its maximum point, as illustrated in Fig. 21, to permit maximum reciprocation between the follower and cam.

It is pointed out at this time that it is preferred that the threading relationship between the tool holder and the oscillating male member be disposed between two ground surfaces 133 for alignment purposes. Then, when the taper 38 upon the female member is inserted into the spindle 15 upon the drill press the female taper 134 in the tool holder is in good alignment therewith.

As shown in Fig. 23 in place of a tool holder having a taper 134, of any given size, a three jaw chuck 17 can be mounted in place by a connecting unit 136.

Figures 24 to 26

Another modification by which the relative drop between the cam and follower can be regulated is illustrated in Fig. 24. In this particular construction the pin 101a is received in an axial flange 137 formed integrally with the cam 47b at right angles to the spacing of the cam depressions 79 (Fig. 25), the cam being permitted to teeter slightly for the cam and followers to adjust themselves. Moreover, the cam and follower parts are disposed between the frictionless bearings, the lower of which is a radial thrust bearing 140 and the upper of which is an end thrust radial angular contact bearing 98 to widen the alignment supports for the housing 22a. In this particular embodiment the pin 84a, supporting the follower, is of an O. D. the same as the I. D. of the inner race of the follower 52a.

Other features of construction will be apparent from a study of the drawing, such as an alignment insert 141 by which the parts can easily be machined to establish close alignment between the female spindle 94a and the upper end 142 of the male spindle 97a. Internal grinding of the female member 94a is thus minimized with the construction shown in Fig. 24. The alignment points of contact between the male and female members are spaced much wider than in Fig. 21 to provide for maximum alignment. Furthermore, for best alignment the male spindle has formed integrally at the bottom thereof an extension 143 in which is formed the Morse taper 134. In addition to this, the female spindle 94a extends all the way through the assembly to terminate at the bottom thereof in an end indicated at 138.

Below the end 138 of the female spindle 94a the male spindle 97a is provided with threads 144 upon which is threaded an adjusting nut 145 and a lock nut 146.

As more particularly shown in Fig. 26 the lower end 138 of the female spindle is provided with graduations 147 and the adjusting nut 145 is provided with a pointer indicia 148 to cooperate with the graduations 147. With this arrangement, two open end wrenches can be located upon the hex faces of the nuts 145 and 146, and the upper limit of the telescoping relationship between the male and female members determined by turning the adjusting nut 145 in either direction, a right hand turn narrowing the range of movement, and the left hand turn widening the range of movement. Otherwise, identical or similar parts are referred to by identical numbers.

In both of the embodiments shown in Fig. 21 and Fig. 24, reciprocation between the follower and cam elements may be entirely eliminated to have the device operate with conventional drilling. This latter feature is not as important with the attachments disclosed herein as the ability of the several devices to be adjusted to vary the distance of reciprocation, whereas on the other hand this feature of removing oscillation from operation is more important where a cam and follower arrangement similar to that disclosed herein is installed as original equipment in the spindles of drill presses themselves, the relative value of the several features described varying, depending upon whether the process of the invention is employed with an attachment or as original equipment in a drill press.

Figure 27

The embodiment illustrated in Fig. 27 is one whose parts and elements can be turned out upon automatic screw machines. The outer shell 150 can be made from a piece of pipe and internally countersunk and threaded at both ends as at 151 to receive the top member 152 and the lower seal carrying member 153, respectively. A spacer 154 is received against a shoulder 155 to support the cage 156 in proper position, and also a spacer 157 is received against a second shoulder 158 to support the upper bearing 90 in place. Otherwise, the parts are substantially the same as those described in connection with the other views to the extent that like numbers refer to like parts.

Grease fittings are used with the device such as the Zerk fitting shown in Fig. 27. The compartment surrounding the pin and spring assembly may be lubricated with grease through the fitting 160 at regular intervals of operation. Suitable passageways are provided in the cage for the passage of grease to all parts which should receive lubricant. In the embodiment described in Figs. 21 and 24 there is sufficient clearance in the opening 82 for grease to pass through to critical parts, but in the embodiment shown in Fig. 27 where the inner race of the bearing 80 is press fitted against the outer surface of the female member and the spacer 154 seals the cage with respect to the housing 150, grease passageways 161 are provided by which grease is able to reach the cam and follower assembly therebelow.

The operation of the device is quite simple from a mechanical viewpoint, depending upon the number of dips in the cam tracks which are to be followed by the followers. The number of reciprocations per revolution of the male and female spindles may be provided, as desired. In the several embodiments, one reciprocation takes place each revolution, but in event the work piece is rotated at the same speed as the drill, but in opposite directions, as already mentioned, two dips will be provided for the followers each revolution.

When the invention is placed in operation, the cam and follower arrangement will cause the drill periodically to move to the upper limit permitted to it either by the depth of the cam, or by the limit imposed on the system by the several adjustments described. This cuts the chips to a predetermined size and length. Thereafter, the incline upon the cam immediately returns the drill to its cutting position. For this purpose, the spring 46 should be sufficiently strong to assure that the drill follows the contour of the cam to the extent that it is permitted to do so in the system, having in mind the adjustment as to depth which is provided herein. Chips are cut into uniform independent particles as fast as the cut progresses, and the particles find their way out through the drill flutes quite easily without the conventional need of pulling the drill out of the cut to clear the chips. In addition to this, and depending somewhat upon higher drilling speeds, if the drill is the part which is moved axially during the dropping away of the drill and work piece, the drill is moved back and forth axially fast enough to establish a vibratory action that keeps the chip particles free and loose. The chips then clear the flutes readily as urged by the spiral upon the drill, and the lubricant reaches the bottom of the cut.

Moreover, the small chip particles are curled and individually compacted sufficiently tight that their friction with the wall is negligible. In this form the chips after clearing the bushings easily can be washed away to a depository by the lubricant, the fixture and work table being kept continuously clean even while the drilling operation is proceeding. Furthermore, it will be appreciated that the invention provides a new and improved apparatus for the deep hole drilling of a wide miscellany of materials, especially metals and plastics of a soft or stringy nature; an improved continuous forward feed for twist drills; an improved chuck holder which superimposes an improved secondary feed characteristic upon the main forward feed traverse of a drill press or the like; an improved feed cycle for a twist drill and means for accomplishing same; and combines with the twist drilling operation some of the advantages of percussion feed.

In addition to these advantages and results the invention eliminates additional spindles or heads in multistage automatic machining when heretofore additional heads have been required to pick up the cut where previous drills have left off in deep hole drilling. In fact, with the present invention a deep hole can be drilled at one station and in one pass, if desired.

Also, it will be seen that within the contemplation of the present invention there are many advantages in the safety to personnel from flying work-hardened chips or broken drills, and from the unpleasantness of splashing lubricant; the flexibility of the process for use interchangeably with either automatic or sensitive feeds, and, with female or unskilled labor; improved operating conditions conducive to longer tool life; adaptability of the process for use with otherwise conventional equipment and drills; the liberty in fixture design to locate bushings directly against the work without impairing chip clearance; better hole alignment, wall finish and hole size; the availability of the chips for remelting or alloying, and for material analysis.

Thus, from the description provided, it will be seen how the objects and results of the invention are attained, and, although in some respects we are not able to account fully for some of the improved results which are obtained by the method and apparatus of this invention, it should be understood that any attempt to analyze the theory which is believed to be responsible for these results is to be construed not as defining a specific or limited mode of operation, but merely as a possible explanation of certain physical and metallurgical phenomena which have been observed.

Consequently, although certain forms and embodiments have been illustrated and described herein, it will be observed that various uses, modifications, and changes may be made without departing from the spirit and substance of the invention, the scope of which is commensurate with the appended claims.

The present invention is a continuation-in-part of my co-pending application, Serial No. 455,417, filed August 20, 1942, for Chip breaking drill chuck, and is related to my co-pending applications 466,273, filed November 20, 1942, and 468,399, filed December 9, 1942, reference to which is hereby made to the extent that a further understanding of the present invention is concerned. The method of the present invention is covered generically in the aforesaid application, Serial No. 455,417, and the present application is generic to said copending applications in respect of claims on the various forms of apparatus.

What is claimed is:

1. A device of the class described comprising a rotary drive member, a supporting member, a rotary driven member supported in axially sliding driven relation to the drive member, an oscillator for said driven member including a cam element and a follower element, one of said elements being carried by the driven member, and the other of said elements being carried by the supporting member, and means for holding said supporting member against rotation, said cam and follower elements cooperating to hold the driven member in relative fixed axial position during the major portion of a revolution and to impart to the driven member an axial oscillation less than .04 of an inch within 90° of a revolution.

2. A chip comminuting and drilling attachment for a drill press comprising an element adapted to engage the spindle of a drill press in rotary drive relationship, a housing carried by said element, a second element rotated by the first and axially reciprocable with respect thereto, a feed pressure bearing cam member, a follower member, one of the members being carried by the second element, and the other member carried by the housing, and means upon the second element for supporting a drill, said cam member and follower member imparting a feed relaxing reciprocation of a fraction of an inch to the second member of a duration less than 90° of relative rotation between the members.

3. A device of the class described comprising means for rotating a drill continuously in one direction, means for traversing the drill with a continuous feed movement, and means for oscillating the drill axially a small fraction of an inch repeatedly within a minor portion of a revolution in stepped relation to the rotation of the drill, said oscillating means including a cam and follower arrangement wherein the higher portion of the cam supports the drill in its cutting position and the low portion of the cam permits the drill to drop away from its cutting position.

4. A device of the class described for use in a machine shop comprising means for rotating a drill continuously in one direction, means for traversing the drill with a continuous feed movement, and means for oscillating the drill axially a small fraction of an inch repeatedly, in stepped relation to the rotation of the drill, said oscillating means including a cam and follower assembly having a dwell over the major portion of their coaction for carrying the end thrust pressure upon the drill arising from feed traversing the drill into a work piece and a relief over the remaining portion, and a resilient element urging retraction of the drill from the work piece a distance of a small fraction of an inch when the cam and follower are at the low point of the relief on the cam.

5. A machine for drilling a stringy material comprising means for rotating a drill continuously in one direction, means for traversing the drill into the material by a feed traverse, and mans for vibrating the drill axially during said feed traverse with a periodic motion accomplished within a minor portion of a revolution to comminute the chips formed during rotary movement of the drill over a major portion of a revolution.

6. An automatic drilling machine adapted to handle stringy metals comprising a work support turntable, a head, a drill of predetermined diameter driven by the head, means for feed traversing the drill in a continuous feed movement of a distance in excess of four diameters of the drill without withdrawing the drill from the cut, an element pulsating with a predetermined degree of rapidity, and means controlled by said pulsating element for oscillating said drill axially within a minor portion of a revolution of the drill in stepped relation to said pulsations.

7. In a drilling machine, a drill supported and driven by a head, a work piece supported with respect to said head, said drill having a predetermined diameter, means for traversing said head and work with respect to each other in a substantial constant feed movement of a distance greater than four diameters of the drill, and means synchronized with the rotation of the drill for oscillating the drill axially within a minor portion of a revolution thereof with a pretermined degree of rapidity during said feed movement.

8. For use upon a drill press, a drill drive and oscillator comprising, a housing, means for supporting the housing against rotation, a shank journalled in the housing and adapted to be received in drive relationship upon the drill press, a spindle journalled in the housing and adapted to support a drill in operative position, and means interconnecting the shank and spindle in direct drive relationship at the same speed including an element permitting movement of the spindle axially relative to the shank, and means for oscillating said spindle axially to retract it momentarily within a minor portion of a revolution in stepped relation to its rotation.

9. A device of the class described comprising a rotary drive member, a drill feeding rotary driven member, means for supporting the driven member in driven relationship to the drive member and for movement axially with respect thereto, cam means for moving one member axially with respect to the other to feed the drill including a cam device having concentric paths and a follower device having a follower for each path, one of said devices being carried by one of the rotary members and the other of said devices being carried by the supporting means, said devices engaging each other at spaced points upon opposite sides of the axis of rotation, and means for supporting the supporting means against rotation, said cam means in one of the relative positions of said devices interrupting the feed of the driven member once each rotation of said driven member.

10. A drilling assembly comprising a housing, a driven shaft journalled in the housing, a cam device including a member having two concentric paths thereon each with a single relief and a dwell sustaining feed pressures, a follower device cooperating with said cam device and including a rotor for each path, one of said devices being carried by the housing, and the other of said devices being carried by the driven shaft, resilient means for inducing a constant contact between said devices, and means for mounting a drill upon the outer end of said driven shaft in operative position, said devices cooperating with each other to impart to the drill a reciprocating retraction thereof once each revolution of the drill to comminute the chips formed by the drill.

11. A device for drilling machinable material comprising, in combination, a supporting member adapted to be constrained against rotation, a shaft member disposed on an axis projecting through said supporting member and adapted to be connected for rotary power drive and for limited independent axial movement relative to said supporting member and to support a fluted drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto, the other of said elements being supported from said shaft member in opposed relation to said one element, and being operatively connected to said shaft member for rotary drive therefrom, said elements being operable at least once during each relative revolution therebetween to effect an axial reciprocation of said shaft member with respect to said supporting member out of normal cutting position comprising first a relief stroke and then a return stroke through a small fraction of an inch each time within a minor portion of said revolution, whereby during drilling to break the curls being made by the drill into chips capable of passing outwardly along the drill.

12. A device for drilling machinable material comprising, in combination, a supporting member adapted to be connected for uniform cutting feed movement and to be constrained against rotation, a shaft member disposed on an axis projecting through said supporting member in the direction of said movement and adapted to be connected for rotary power drive and limited independent axial movement relative to said supporting member and to support a fluted twist drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto, the other of said elements being supported from said shaft member in opposed relation to said one element, and being operatively connected to said shaft member for rotary drive therefrom, said elements being operable at least once during each relative revolution therebetween to effect an axial reciprocation of said shaft member with respect to said supporting member out of normal cutting position comprising first a relief stroke and then a return stroke each time within a minor portion of said revolution through a distance sufficient to effect substantially uniform comminution of the curls being made when drilling by the drill into chips capable of passing outwardly along the drill.

13. A drilling attachment for a non-rotatable and axially translatable quill having a spindle journalled therein for translation therewith, said attachment comprising, in combination, a supporting housing member adapted to be operatively connected for translation with said quill and to be constrained against rotation, a drive shaft member journalled in said housing member against relative axial displacement and adapted to be connected for rotary power drive to said spindle, a driven shaft member journalled in and projecting from said housing member and connected for joint coaxial rotation with said drive shaft member and independent relative axial movement and adapted to support a coaxial drill at its outer end, and relatively revoluble coacting cam and cam follower elements for normally sustaining said driven shaft member against the axial drilling thrust, one of said elements being carried by said housing member in fixed axial position relative thereto, the other of said elements being supported from said driven shaft member in opposed relation to said one element, and being operatively connected to one of said shaft members for rotary drive therefrom, said elements being operable at least once during each relative revolution therebetween to effect an axial reciprocation of said driven shaft member with respect to said housing member out of normal cutting position comprising first a relief stroke and then a return stroke through a small fraction of an inch each time within a minor portion of said revolution, whereby during drilling to break the curls being made by the drill into chips.

14. A device for drilling machinable material comprising, in combination, a supporting member adapted to be mounted for continuous forward cutting feed in a given direction and to be constrained against rotation, a shaft member disposed on an axis projecting through said supporting member in said direction and adapted to be connected for rotary power drive and for limited independent axial movement relative to said supporting member and to support a fluted drill at one end in coaxial relation thereto and for rotary and axial movement therewith, and relatively revoluble coacting cam and cam follower elements for normally sustaining said shaft member against the axial drilling thrust, one of said elements consisting of a ring encircling said shaft and fixed on said supporting member and having an annular end cam face defining a dwell over a major portion of the circumference and a recess over the remaining portion of the circumference and of a depth amounting to a small fraction of an inch, the other of said elements consisting of a radial encircling flange on said shaft member and having a follower revoluble thereby in contact with said cam face, resilient means tending to maintain said follower in contact with said cam face, said elements being operable once during each shaft rotation to effect an axial reciprocation of said shaft member with respect to said supporting member out of normal cutting position comprising first a relief stroke and then a return stroke, through a distance sufficient to break the chips.

15. A device for drilling machinable material comprising, in combination, a supporting member adapted to be connected for uniform cutting feed movement and to be constrained against rotation, a shaft member disposed on an axis projecting through said supporting member in the direction of said movement and adapted to be connected for rotary power drive and limited independent axial movement relative to said supporting member and to support a fluted twist drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto, the other of said elements being supported from said shaft member in opposed relation to said one element, and being operatively connected to said shaft member for rotary drive therefrom, said elements being operable at least once during each relative revolution therebetween to effect an axial reciprocation of said shaft member with respect to said supporting member out of normal cutting position comprising first a relief stroke and then a return stroke each time within a minor portion of said revolution through a distance sufficient to effect substantially uniform comminution of the curls being made when drilling by the drill into chips capable of passing outwardly along the drill, and adjustable means operable at will for preventing or varying the extent of said axial reciprocation of said shaft member within the maximum permissible range.

16. A device for drilling machinable material comprising, in combination, a supporting member adapted to be mounted for continuous forward cutting feed in a given direction and to be constrained against rotation, a shaft member disposed on an axis projecting through said supporting member in said direction and adapted to be connected at one end for rotary power drive and for limited independent axial movement relative to said supporting member and to support a fluted drill at one end in coaxial relation thereto and for rotary and axial movement therewith, and relatively revoluble coacting cam and cam follower elements for normally sustaining said shaft member against the axial drilling thrust, one of said elements being carried by said supporting member in fixed axial position relative thereto and the other being supported from said shaft member and operatively connected thereto for rotary drive, one of said elements being a cam with two concentric cam tracks and with a dwell area over the major portion of the circumference and a relief recess over the remaining portion of the circumference, and the other comprising two cam follower rollers supported at opposite sides of the shaft axis and rolling respectively on said cam tracks, said recesses also being located at opposite sides of said axis and being a small portion of an inch in depth, said elements being operable once during each relative revolution therebetween to effect an axial reciprocation of said shaft member with respect to said supporting member out of normal cutting position comprising first a relief stroke and then a return stroke through a distance sufficient to break the drill chips.

17. A device according to claim 16 in which said cam is secured to said shaft member and said cam follower rollers are mounted on said supporting member, and in combination with positive stop means for limiting the maximum permissible extent of axial movement between said shaft member and supporting member, eccentric bearings for supporting said rollers on an axis extending transversely of said first member, and means for adjusting said eccentric bearings to vary the extent of said axial reciprocation of said shaft member.

18. A device for drilling metal and the like comprising, in combination, a casing, a drive spindle journalled in said casing, said casing being adapted for cutting feed translation in a direction axially of said spindle and to be constrained against rotation, said spindle being translatable axially with said casing, a driven spindle journalled in said casing and projecting therefrom for attachment thereto of an end cutting tool, means connecting said spindles for joint rotation and relative axial movement, and cam means within said casing for sustaining said driven spindle normally in projected position against inward axial thrust, said cam means comprising an element constrained against axial movement relative to said casing and an opposed element revoluble in synchronism with said driven spindle and constrained against axial movement relative to said driven spindle, one of said elements defining an annular cam track with successive dwell and relief areas and the other reacting through follower roller means contacting and movable along said cam track, whereby as an incident to the rotation of said driven spindle said dwell and relief areas are operative to effect a reciprocation of said driven spindle out of said projected position in an inward retract movement followed by an outward return movement at least once every one to three revolutions of said driven spindle each time over a minor portion of a revolution of said driven spindle through a small fraction of an inch to effect termination of a chip being formed by the tool when cutting, and between successive reciprocations to impose a cam dwell on said driven spindle in said projected position.

19. A device according to claim 18 in which said drive and driven spindles extend in telescopic relation within said casing and one of said spindles is formed with elongated longitudinal slot means, in combination with a diametrical pin fixed in the other of said spindles and extending through said slot means to spline said spindles together for joint rotation and relative axial movement.

20. A device according to claim 19 in which said drive spindle extends completely through said casing and is journalled therein in axially spaced anti-friction bearings, and said driven spindle extends slidably into said drive spindle.

21. A device according to claim 20 in combination with stop means mounted on said driven spindle for abutment with the terminal end of said drive spindle, said stop means being adjustable axially on said driven spindle, whereby to limit the inward retracting movement of said driven spindle selectively in extent to less than normally permitted by said dwell and relief areas.

22. A device according to claim 18, in combination with means for locking said driven spindle at will in said projected position, thereby rendering said cam means ineffective to cause said reciprocation.

23. A device according to claim 19 in which said element with said cam track is slidable axially on said drive spindle and is connected by said pin to said driven spindle for axial movement therewith.

24. A device according to claim 18 in which said element with said cam track is a disk secured coaxially to said driven spindle, and said cam track comprises two similar concentric paths formed in one face of said disk 180° out of phase, and said roller means comprises two anti-friction bearing rollers in combination with a fixed cage within said casing, said rollers being supported in said cage at opposite sides and transaxially of the spindle axis for rolling contact respectively with said paths.

25. A device according to claim 11 in which said cam element comprises a ring having on one side face an annular cam track and being removably inserted about said shaft member, in combination with stop means for locating said ring axially with respect to said shaft member, and means removably secured to said shaft member for releasably maintaining said ring against said stop means.

26. A device according to claim 11 in which one of said elements is a cam having a plurality of coaxial cam tracks each with alternating relatively long dwell and relative short relief areas, and the other of said elements comprising a plurality of peripherally spaced cam followers traveling respectively along said tracks, all of said followers being disposed in like angular phase relation to their respective tracks.

27. A device according to claim 11 in which said cam element comprises a generally flat ring being removably inserted about said shaft member and having a flat annular face on one side and an irregular annular face formed with alternate dwell and relief areas to define a cam track on the other side, in combination with stop means for locating said ring axially in position, and means for releasably maintaining said ring against said stop means, whereby said ring is reversible in position to present either of said faces selectively for coaction with said cam follower element.

28. A device according to claim 10 in which said driven shaft is provided with a stop shoulder, and said cam device is carried by said driven shaft in position against said stop shoulder and when so positioned is constrained for rotation with said driven shaft, and said means for mounting the drill is threaded onto one end of said driven shaft against said cam device to releasably retain said cam device in position against said stop shoulder.

JOHN W. KARWEIT.

REFERENCES CITED

The following references are of record in the file of this patent:

UNITED STATES PATENTS

| Number | Name | Date |
| --- | --- | --- |
| 463,973 | Palmer | Nov. 24, 1891 |
| 627,074 | Conway | June 13, 1899 |
| 800,894 | Baldwin | Oct. 3, 1905 |
| 1,196,656 | Bughee | Aug. 29, 1916 |
| 1,523,629 | Bullock | Jan. 20, 1925 |
| 1,659,238 | Boyce | Feb. 14, 1928 |
| 2,105,762 | Zimmerman | Jan. 18, 1938 |
| 2,328,542 | Bates | Sept. 7, 1943 |

OTHER REFERENCES

U. of Ill. Bulletin #103, vol. XV #13. (Copy on file in Div. 47.)